Oct. 12, 1971  E. W. HAUG  3,611,772
APPARATUS FOR ROLLING TOOTHED PARTS
Filed Sept. 29, 1969  8 Sheets-Sheet 1
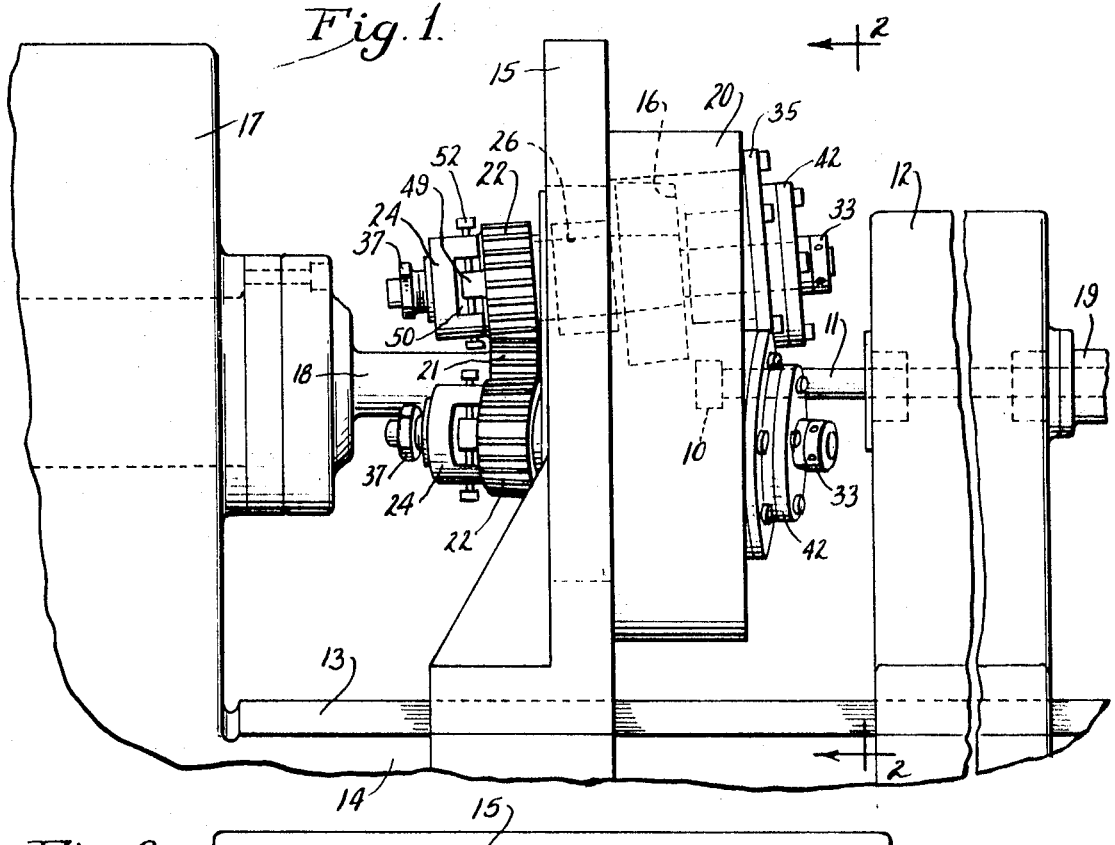
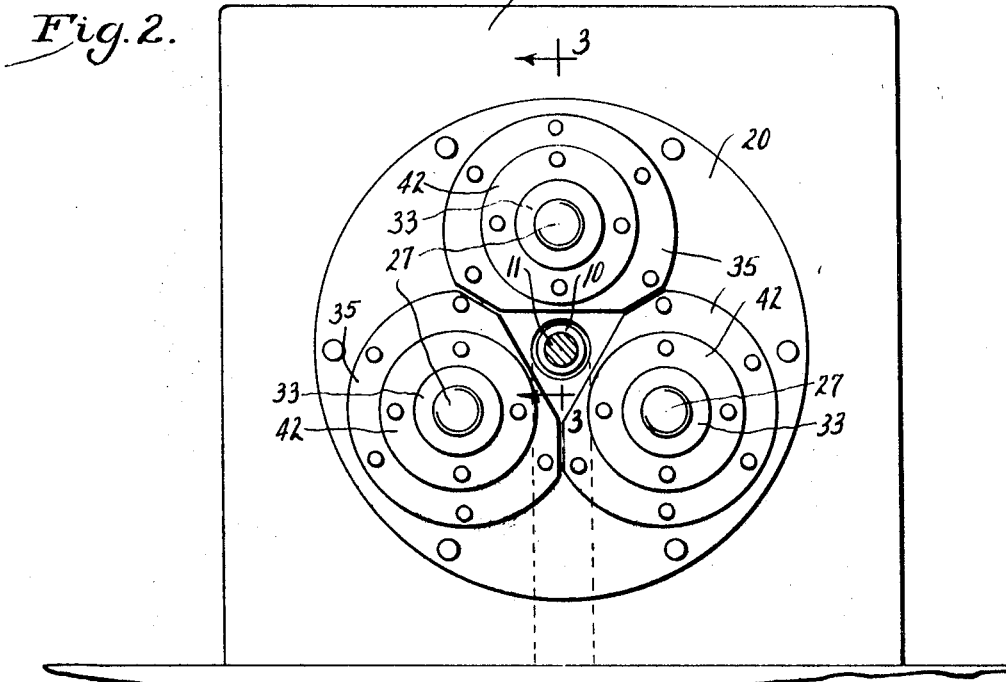
INVENTOR.
Edward W. Haug
BY
Wolfe Hubbard Voit & Osann
ATTORNEYS

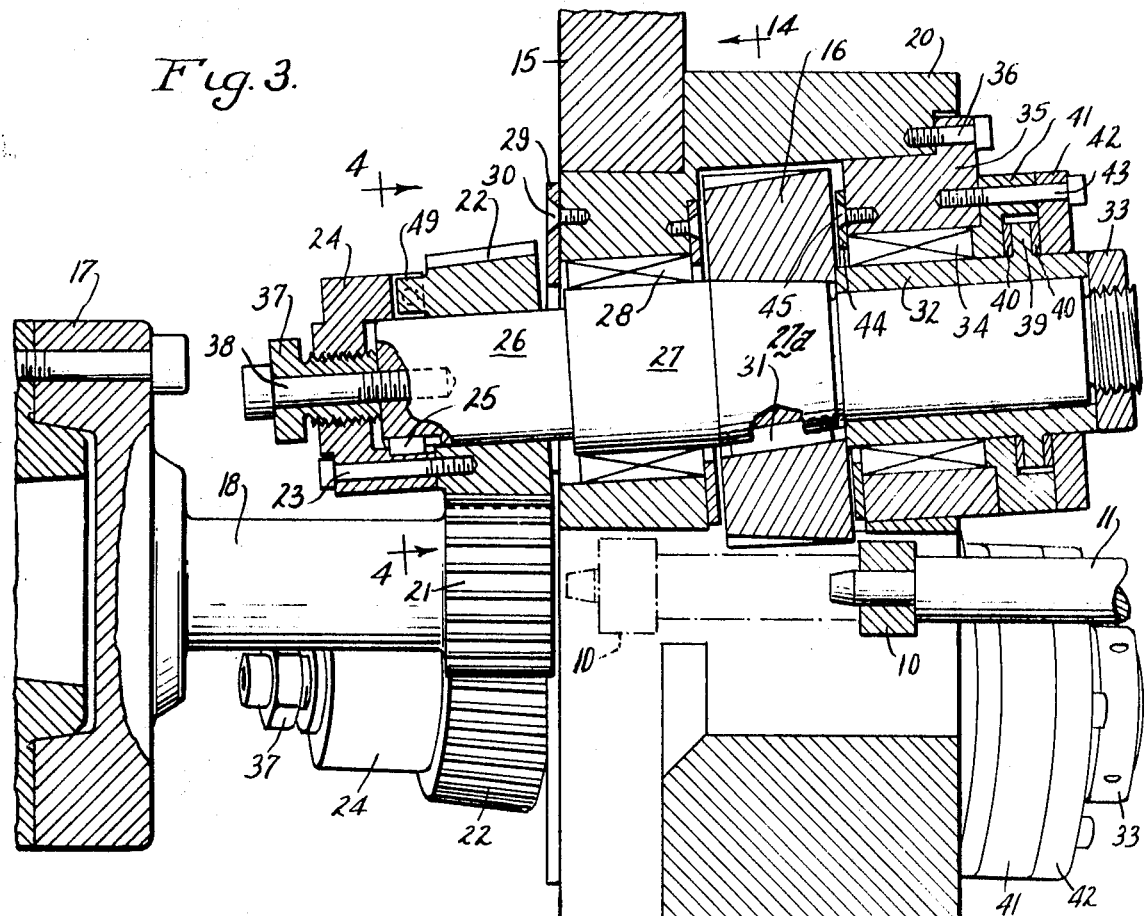
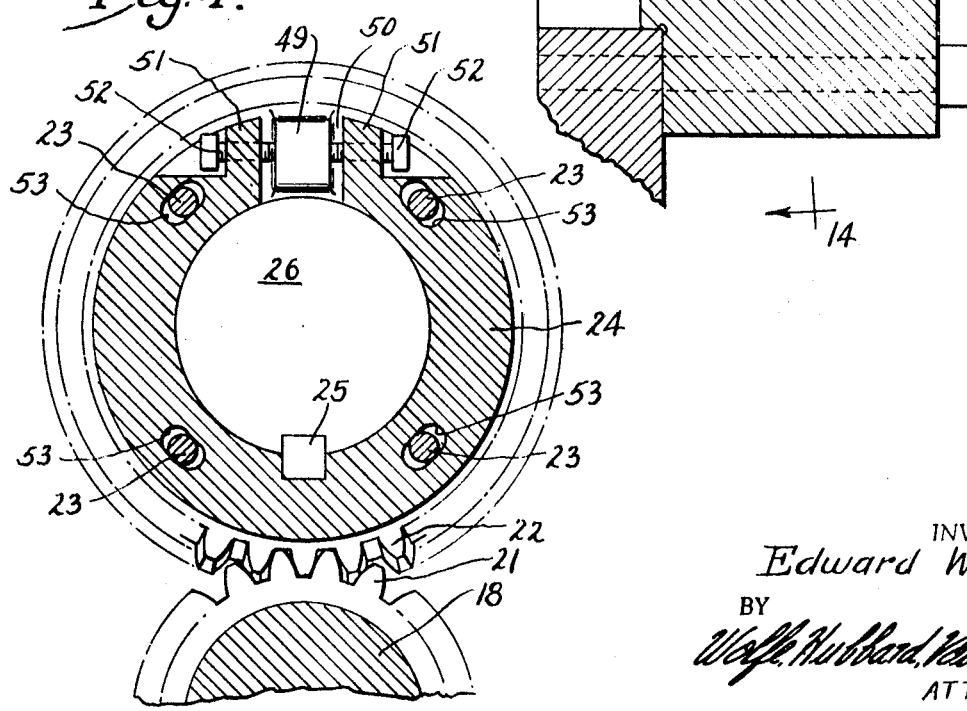

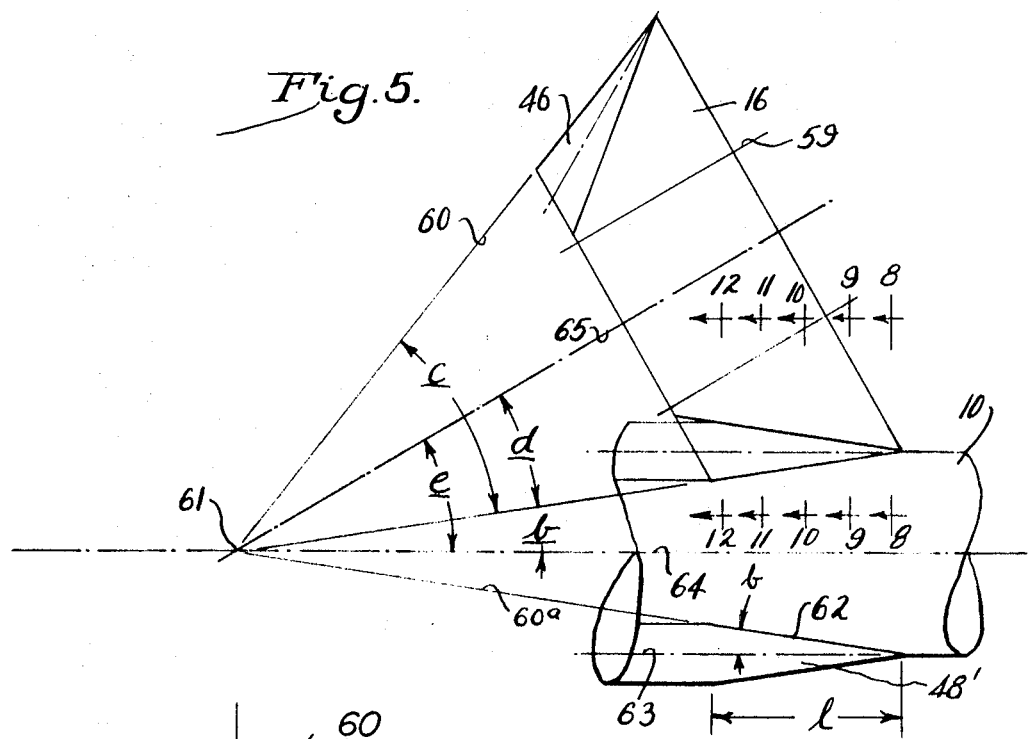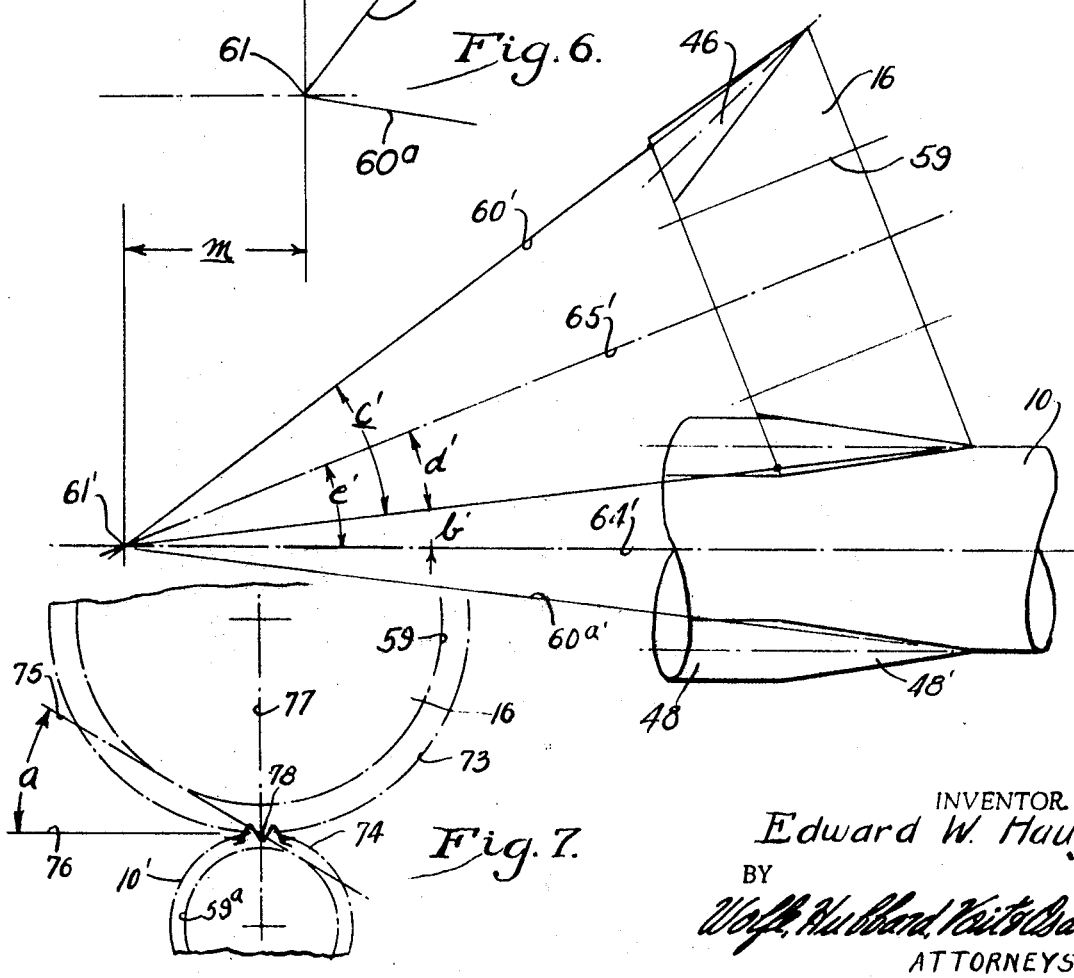

Oct. 12, 1971                E. W. HAUG                3,611,772
APPARATUS FOR ROLLING TOOTHED PARTS
Filed Sept. 29, 1969                              8 Sheets-Sheet 4
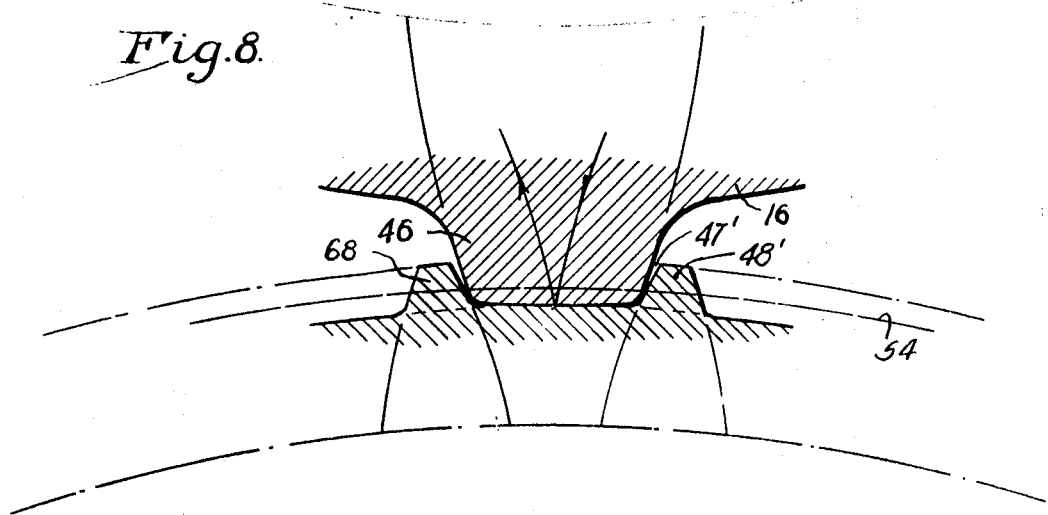
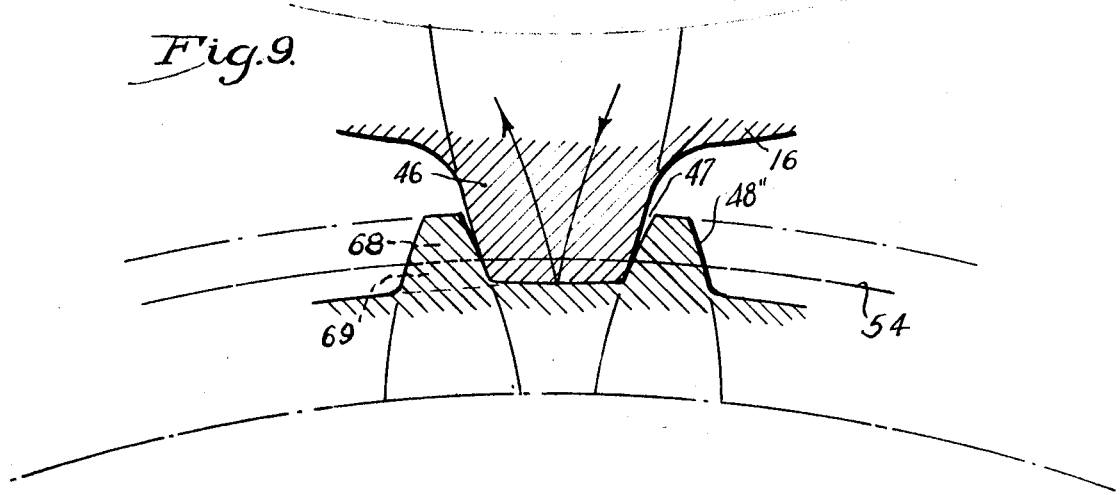
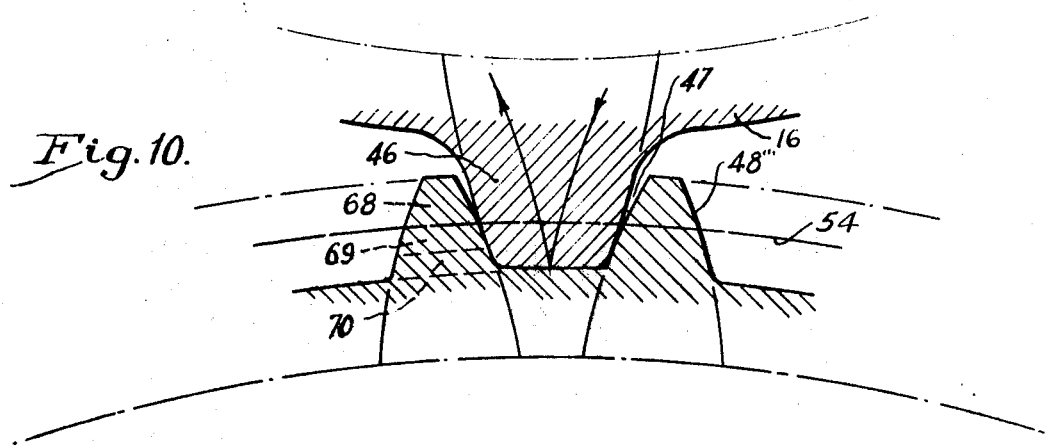
INVENTOR.
Edward W. Haug
BY
ATTORNEYS

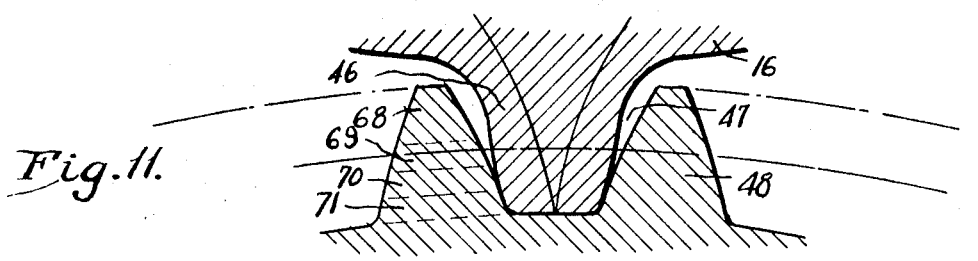
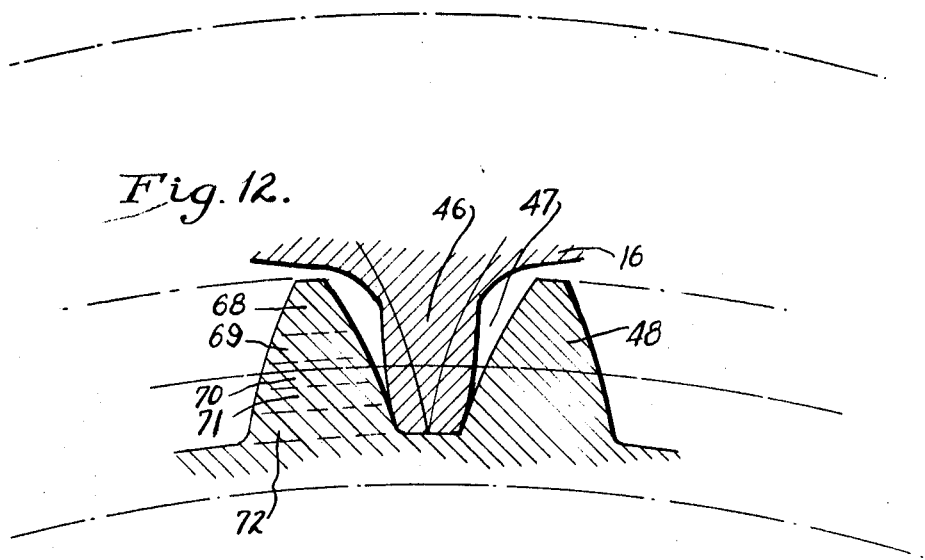
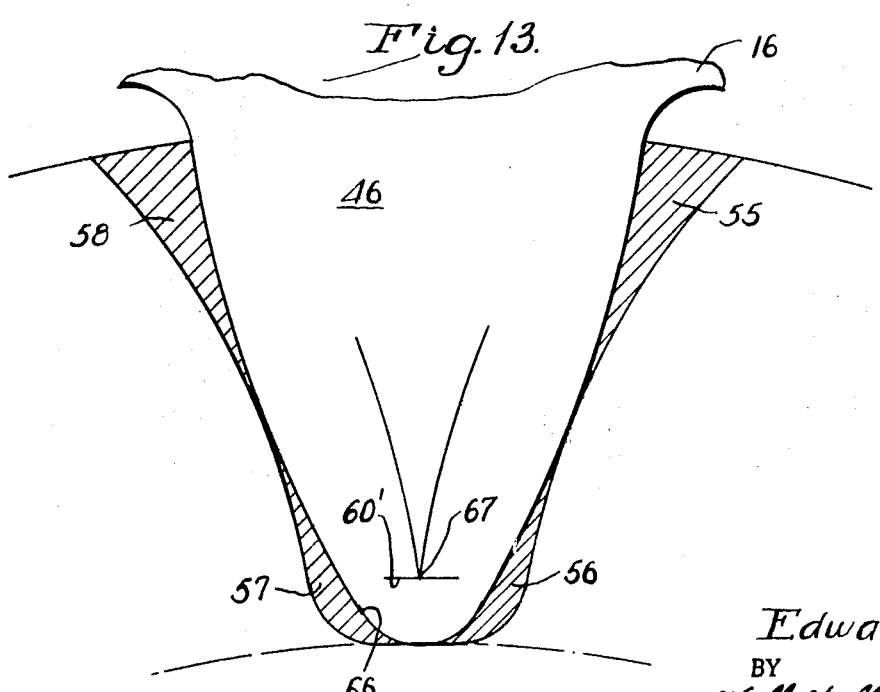

Oct. 12, 1971     E. W. HAUG     3,611,772
APPARATUS FOR ROLLING TOOTHED PARTS
Filed Sept. 29, 1969     8 Sheets-Sheet 6
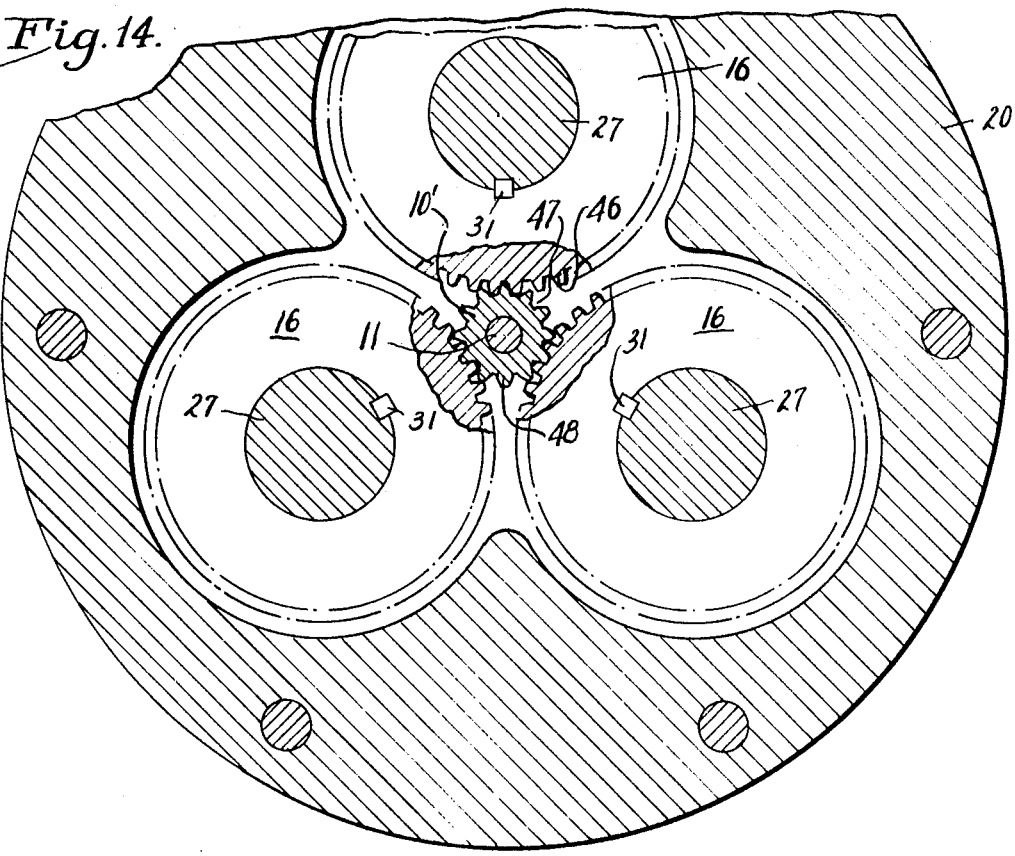
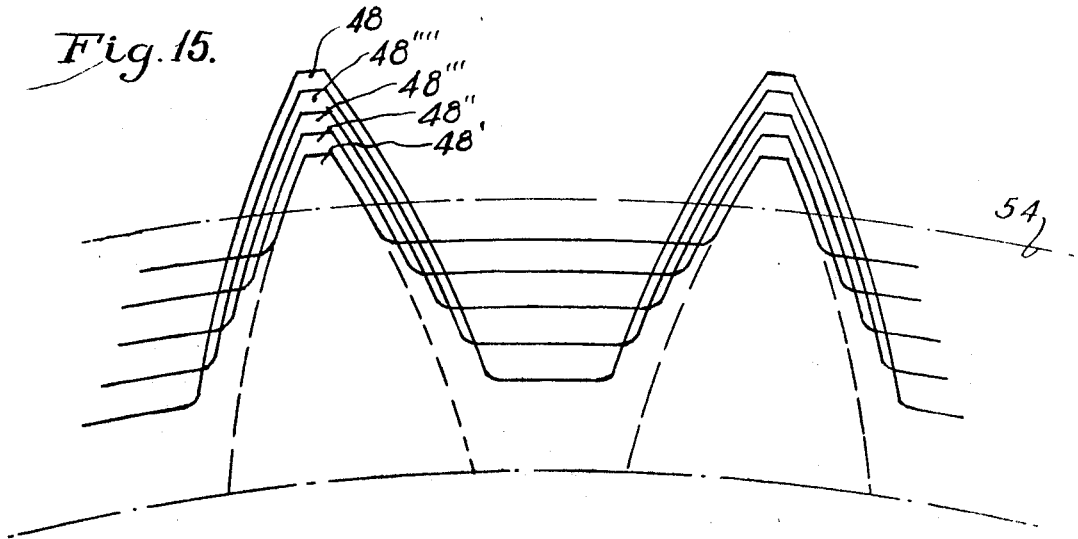
INVENTOR.
Edward W. Haug
BY
Wolfe, Hubbard, Voit & Osann
ATTORNEYS

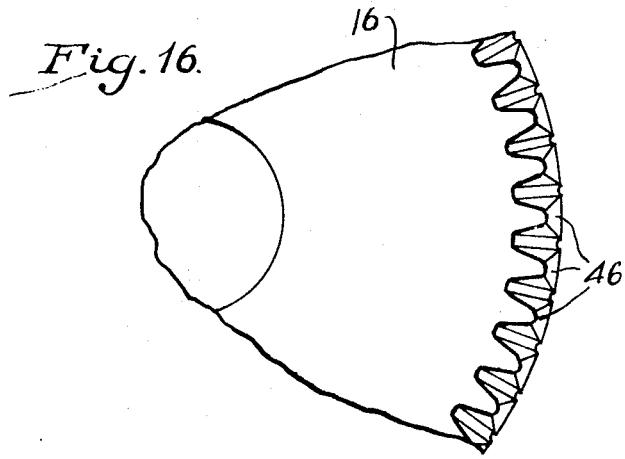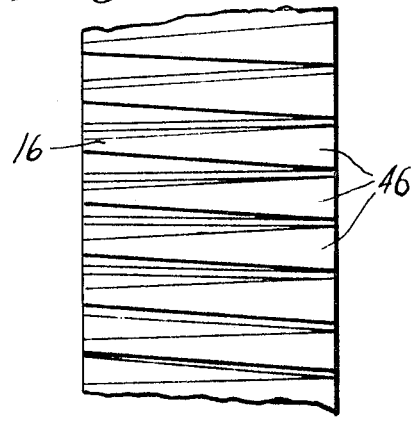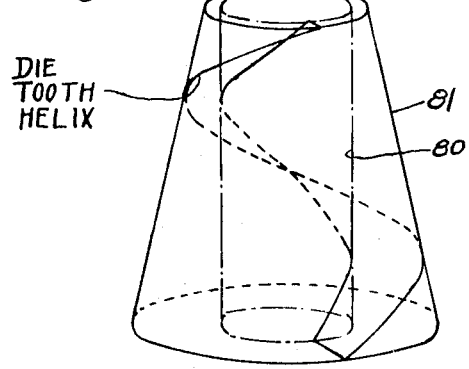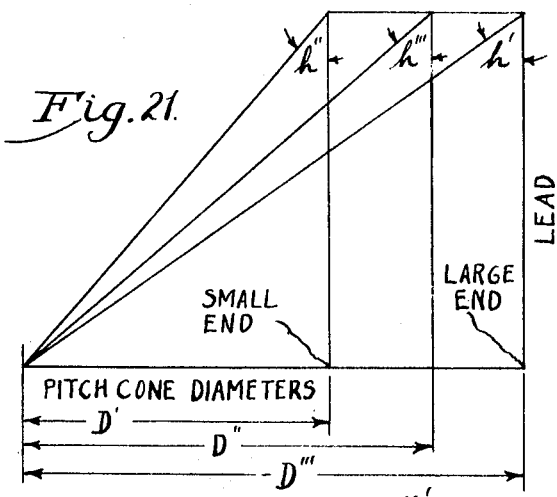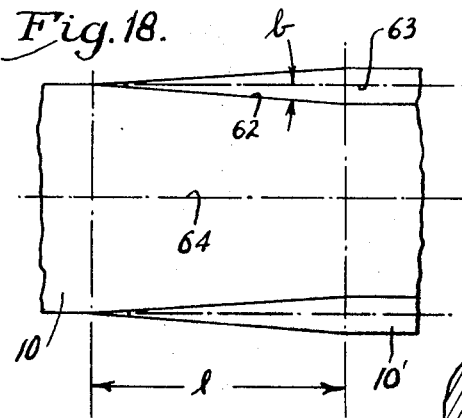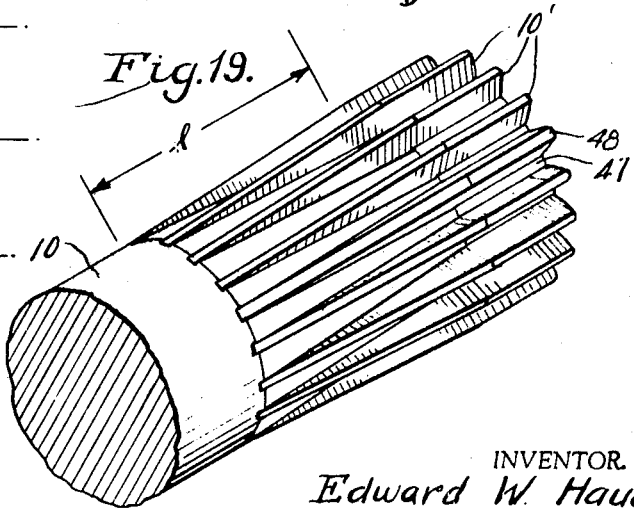

INVENTOR.
Edward W. Haug
BY
ATTORNEYS

United States Patent Office 3,611,772
Patented Oct. 12, 1971

3,611,772
APPARATUS FOR ROLLING TOOTHED PARTS
Edward W. Haug, Rockford, Ill., assignor to Barber-Colman Company, Rockford, Ill.
Filed Sept. 29, 1969, Ser. No. 861,795
Int. Cl. B21d 15/04
U.S. Cl. 72—105          32 Claims

ABSTRACT OF THE DISCLOSURE

A method and machine for rolling gears from a cylindrical workpiece in which the workpiece is rolled between dies which displace metal on the peripheral portion of the workpiece to flow the metal of the workpiece so as to form gear teeth and the interdental spaces on the workpiece. In the ideal practice of the invention, the dies are designed so that essentially all of the work performed in forming the gear teeth is accomplished by having the die teeth apply a rolling force to work without applying a sliding force. In this ideal form, this is achieved by using conical dies with the pitch circles of the die teeth at the surface of the tip of the teeth from one end of the die to the other and with the base circles of the teeth the same throughout the length of the die. In most cases, the ideal tool is not practical because the die teeth would be structurally unsatisfactory but essentially the same results may be achieved by moving the pitch circle slightly inwardly from the tips of the teeth.

BACKGROUND OF THE INVENTION

This invention relates to a method and apparatus for forming gears by rolling operation. Thus, a cylindrical workpiece is advanced axially relative to a plurality of dies which engage the workpiece and cause the metal of the workpiece to flow and form the teeth of the gear and the interdental spaces.

SUMMARY OF THE INVENTION

The principal object of the invention is to provide a new and improved method and apparatus for rolling gears to produce a gear which requires substantially less finishing, which has an improved metallurgical grain structure, which is made faster as compared to prior methods and which is made in such a way that the dies or tools have an appreciably longer service life. These ends are achieved by the use of novel dies which essentially flow the metal of the workpiece by rolling contact between the dies and the workpiece so that there is little or no interference, other than the work performing interference, between the teeth of the dies and the worpiece as the die teeth roll into and out of the interdental spaces of the gear being formed. Basically, this is achieved by using conical dies with teeth which have pitch circles at or near the outer surfaces of the die teeth but which have a constant base circle from one end of each die to the other. The base circle is correlated with the base circle of a gear which would mesh with the finishing ends of the dies. In a more detailed aspect, the dies are designed to flow the metal of the workpiece radially with a minimum amount of lateral metal flow and this is accomplished by designing the die teeth so that each portion of a tooth of a die gives the final form to an interdental space on the workpiece and to portions of the gear teeth on either side of that interdental space.

BRIEF DESCRIPTION OF THE DRAWINGS

FIG. 1 is a fragmentary side elevation of a machine for rolling gears in accordance with the present invention.
FIG. 2 is a sectional view taken along the line 2—2 in FIG. 1.
FIG. 3 is an enlarged fragmentary sectional view taken along the line 3—3 in FIG. 2.
FIG. 4 is an enlarged fragmentary sectional view taken along the line 4—4 in FIG. 3.
FIG. 5 is a schematic view of the gear rolling die and the workpiece and shows the ideal form of the invention.
FIG. 6 is a view similar to FIG. 5 but shows a modified form of the invention.
FIG. 7 is a fragmentary end view of a die and the workpiece.
FIG. 8 is an enlarged fragmentary sectional view taken along the line 8—8 in FIG. 5.
FIG. 9 is an enlarged fragmentary sectional view taken along the line 9—9 in FIG. 5.
FIG. 10 is an enlarged fragmentary sectional view taken along the line 10—10 in FIG. 5.
FIG. 11 is an enlarged fragmentary sectional view taken along the line 11—11 in FIG. 5.
FIG. 12 is an enlarged fragmentary sectional view taken along the line 12—12 in FIG. 5.
FIG. 13 is an enlarged sectional view of a die tooth and the workpiece.
FIG. 14 is an enlarged sectional view taken along the line 14—14 in FIG. 3.
FIG. 15 is a composite view of FIGS. 8–12.
FIG. 16 is a fragmentary end view of a die.
FIG. 17 is a fragmentary side view of a die.
FIG. 18 is a longitudinal sectional view of the workpiece.
FIG. 19 is a perspective view of the workpiece.
FIG. 20 is a schematic representation of a die used for rolling helical gears.
FIG. 21 is a graph showing the changing helix angle of the tooth on a die for forming helical gears.

DETAILED DESCRIPTION OF THE PREFERRED EMBODIMENTS

Figure 22:
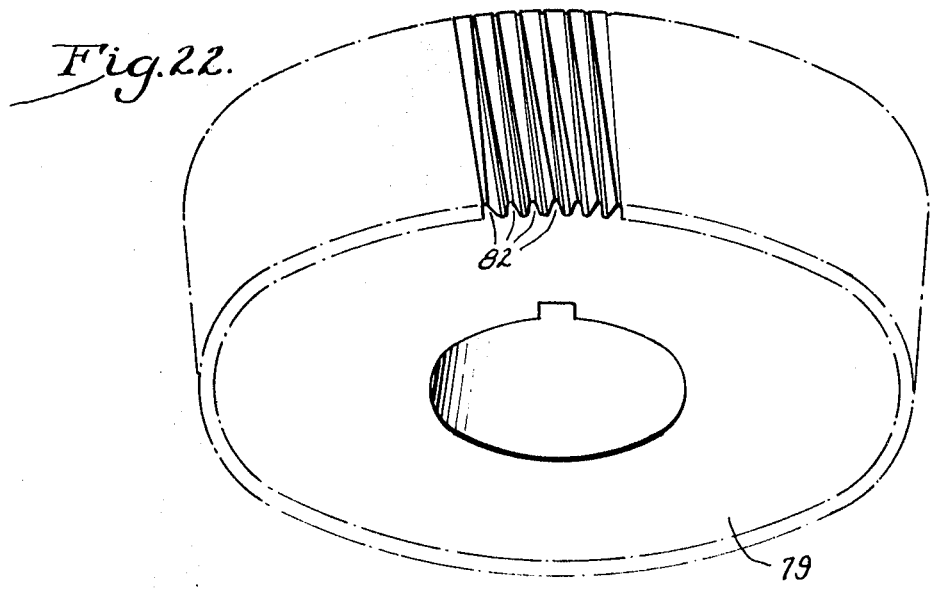
FIG. 22 is a perspective view of a die for forming helical gears.

As shown in the drawings for purposes of illustration, the invention is embodied in a machine in which a cylindrical workpiece or gear blank 10 (FIG. 3) is supported on the end of a horizontal spindle or arbor 11 journaled in an arbor housing 12 (FIG. 1) which is supported to slide horizontally on the bed 13 of the frame 14 of the gear rolling machine. To the left of the arbor housing 12 as viewed in FIG. 1 is a bracket 15 which is mounted on the bed 13 and supports the tools or dies 16, in this case three in number (FIGS. 3 and 14). Further to the left is a drive unit or head stock 17 which is supported on the frame of the machine and includes a horizontal drive shaft 18 which is driven by a suitable power source (not shown) and which turns the dies. During the working portion of the machine's cycle, the arbor is advanced horizontally toward the drive unit by a hydraulic feed cylinder 19 which advances the housing 12 along the bed 13 and thus feeds the gear blank 10 through the dies to form the gear 10' (FIGS. 14 and 19).

In order to support the dies 16 to be driven by the drive shaft 18, the dies are carried in a generally cylindrical head 20 (FIG. 3) which is mounted on the bracket 15 coaxially with the work arbor 11 and the drive shaft. The latter carries a pinion 21 which meshes with three drive gears 22, one for each of the dies 16. The gears 22 are tapered and their axes form an angle with the axis of the shaft 18. Fastened to the end of each drive gear 22 by means of bolts 23 (FIGS. 3 and 4) is an end cap 24 which is keyed at 25 to a spindle or shaft 26 for carrying one of the dies. The die shaft 26 projects through the gear 22 and into the head 20 and inside the head, the shaft is formed with an enlarged cylindrical portion 27. This portion supports the die shaft for rotation in the head by means of a bearing 28 and, at the forward end of the head (the left as viewed in FIG. 3), is a retainer ring 29 which is fastened to the end of the head by screws 30 and which acts as a shield and retains the bearing 28.

Behind the enlarged portion 27 of the die shaft 26 is the die 16 which encircles the shaft and is keyed to the latter at 31. A sleeve 32 is fitted over the rear end of the die shaft and engages the back of the die and a nut 33 threaded on the end of the shaft abuts the rear end of the sleeve so that the die is held firmly on a tapered portion 27a of the shaft behind the enlarged portion 27. Also supporting the die shaft for rotation in the head 20 is a second bearing 34 which encircles the sleeve 32 and is disposed within a block 35 fastened to the head by screws 36.

To take up backlash between the pinion 21 and the gear 22, a screw 37 is threaded through the end cap 24, and abuts the forward end of the die shaft 26 so that, by threading the screw in, the gear 22 is forced into full meshing engagement with the pinion 21. The screw 37 then is held against turning by a conventional locking screw 38. Thrust applied to the shaft 26 during the rolling operation is absorbed by an annular flange 39 on the sleeve 32. The flange is disposed between thrust rings 40 which are held between spaced annular plates 41 and 42, the plates being clamped together and fastened to the head 20 by screws 43 which project through the plates and are threaded into the block 35. The plate 41 also cooperates with a retaining ring 44 fastened to the inner end of the block 35 by screws 45 to hold the bearing 34 in place.

In a gear rolling operation, it is important that the dies 16 be in synchronism with each other, that is, that the teeth 46 (FIG. 14) of each die 16 accurately enter the interdental spaces 47 being formed on the workpiece and thus properly form the teeth 48 of the finished gear 10'. Accordingly, provision is made to adjust the dies angularly about their axes. For this purpose, an ear 49 (FIGS. 1 and 4) on the gear 22 projects into a space 50 between two flanges 51 on the end cap 24, the ear being narrower than the space 50. Set screws 52 are threaded through the flanges 51 and abut opposite sides of the ear 49 so that, by loosening one set screw and tightening the other, the shaft 26 and the die 16 are turned without turning either the gear 22 or the pinion 21. Such turning of the shaft and die is permitted by having the bolts 23 pass through arcuate slots 53 in the end cap.

With the arrangement described above, the housing 12 is shifted to the right on the bed 13 as viewed in FIG. 1 and a gear blank 10 is mounted on the end of the arbor 11. The dies 16 are driven by the shaft 18 through the pinion 21 and the gears 22 and the cylinder 19 is energized to advance housing 12 along the bed and thereby feed the workpiece through the dies. As the workpiece engages the dies, the latter cause the workpiece and the arbor to turn and to flow the metal of the workpiece, although in some instances the work may be given an initial rotation before engagement with the dies to prevent slipping between the work and dies. Such flow produces pockets 47' (FIG. 8) which are below the original diameter 54 of the workpiece and projections 48' which extend above the original diameter. As the workpiece progresses through the dies (FIGS. 9–11) the pockets become deeper and the projections become larger until, as the workpiece leaves the dies (FIG. 12), the projections have become the teeth 48 of the gear to be formed and the pockets become the interdental spaces 47 of the gear.

Prior attempts to roll gears from a cylindrical gear blank have encountered one or more of several drawbacks. Among these are the necessity of extensive finishing operations, excessive loads on the teeth of the dies, poor metallurgical grain structure and tooth tip inclusions or folds. The present invention eliminates or materially reduces these drawbacks through the provision of an improved method and apparatus for rolling gear teeth and, more particularly through the use of a die which is constructed and associated with the workpiece in a novel manner.

In accordance with the principal aspect of the invention, the dies 16 constructed and arranged with respect to the workpiece to reduce or, in the ideal form, completely eliminate the application of a sliding force by the die teeth to the workpiece and, instead, form the gear teeth completely by the application of a rolling force. In prior gear rolling methods, part of the sliding force is applied at the bottom of the pockets 47' of the workpiece and flows the metal in the areas 56 and 57 (FIG. 13). Thus, with these prior arrangements, the die will engage and force the metal in the area 57 to flow as the tooth rolls into the pocket and it also will engage and force the flow of metal in the area 56 as the tooth rolls out of the pocket. The metal from these areas flows up and down the sides of the gear teeth being formed and causes the metal of the gear teeth to slip and shear in planes and this results in an unacceptable finish and grain structure. By one aspect of the present invention, this interference or metal shearing is virtually eliminated and, instead, all or substantially all of the metal flow which forms the gear teeth 48 is produced by the application of true rolling force between the die teeth and the workpiece.

In general, to achieve the foregoing, the teeth 46 of the dies 16 are given an involute shape and the base circles of the involute are the same throughout the length of the die. To put it another way, the base circles from one end of the die to the other form a cylinder 59 (FIG. 5). This base circle is one which would produce conjugate tooth action between the die teeth 46 and the teeth 48 of the gear being formed. As shown in FIG. 7, the finished gear 10' may be used for this purpose. The pitch circle 73 of the die 16 is, as will be shown later, preselected and this determines the pitch circle 74 of the gear 10' since the diameters of the pitch circles are directly proportional to the number of teeth on the die and the number of teeth on the gear. The pressure angle also is known and is the angle $a$ between the line 75 and a line 76. The line 75 is tangent to both the base circle 59 of the die and the base circle 59a of the work and the line 76 is perpendicular to a line 77 drawn between the axes of the die and the gear and all these lines 75, 76 and 77 intersect at the point 78. By definition, the line 75 is tangent to the base circles 59 and 59a of the die and gear. Thus, the diameter of the base circle 59 of the die can be computed since it is equal to the diameter of the pitch circle 73 times the cosine of the angle $a$.

While the base circle for the die teeth is constant, the pitch circles of the teeth relative to the partially formed gear teeth, that is, within the length $l$ in FIGS. 18 and 19, define an imaginary frustum of a cone which herein is called the operating pitch cone 60 (FIG. 5). As a result, the shape of each die is frusto-conical and, at the surface of the operating cone, there is true rolling contact or no slip between the teeth of the dies and the partially formed teeth of the work. The apex 61 of the operating pitch cone is coincident with the intersection of axes of the dies and the workpiece and, ideally, the operating pitch cone lies on the outer surfaces of the teeth 46 of the dies.

In designing dies according to the invention, there are a number of factors which are predetermined by the machine to be used and the gear to be produced. Thus, the pitch diameter and the number of teeth for the finished gear to be formed are set. Also, the capacity or size of the gear rolling machine, that is, the size of the head 20 which can be supported by the bracket 15, limits the maximum diameter of the dies and, in this regard, it usually is desirable to make the dies as close to the maximum diameter as possible. Further, the capacity of the machine together with the material of the workpiece guide the designer, based on well known engineering principles, in determining the length along the workpiece over which the gear teeth are to be formed (the length $l$ in FIGS. 18 and 19).

With these preset design factors in mind, the inclined root 62 (FIGS. 5 and 18) of the partially formed teeth forms an angle $b$ with a line 63 parallel to the axis 64 of the workpiece. This angle is one-half the cone angle of the pitch cone 60a (FIG. 5) of the partially formed gear teeth 48', that is, the pitch cone which coacts with the operating pitch cone 60 of the die 16. From this the cone angle $c$ can be computed. Thus, the number of teeth 48 on the gear is known and the number of teeth 46 on the die are known by the design factors discussed above. With this, the angle $d$, which is one-half the angle $c$, may be found by the following equation:

$$\text{Sine angle } d = \frac{Nd}{Nw} \times \text{ sine angle } b$$

where $Nd$ is the number of teeth on the die and $Nw$ is the number of teeth on the gear. The angle $e$ between the axis 65 of the die and the axis 64 of the workpiece is equal to the sum of the angles $b$ and $d$. Thus, the apex of the operating pitch cone is located at the point 61 which is also the intersection of the axis 65 of the die and the axis 64 of the workpiece. The axial length of the die is at least equal to, and preferably somewhat longer than the length $l$, that is, the length along the workpiece over which the gear teeth are formed. In the theoretically ideal form of the invention, the operating pitch cone is coincident with the outer surfaces of the die teeth 46.

As stated earlier, the teeth 46 of the dies are involutes of a base circle which is the same as the base circle of a gear that would mesh with the finishing end of the dies and the base circle is the same from one end of each die to the other. Thus, the base circles throughout the length of a die form the imaginary cylinder 59 (FIG. 5).

In most instances, the theoretically ideal die described above is impractical commercially because it results in die teeth 4 which are structurally unsatisfactory for the beam load to which the teeth are subjected during the rolling operation. The advantages of the invention may be obtained in commercially practical dies by making a slight modification of the theoretically ideal tooth form. To this end, the angle $b$ is reduced to become the angle $b'$ (FIG. 6) and this places the pitch cone 60a' of the partially formed gear slightly inwardly of the tips of the die teeth. The angles $c'$, $d'$ and $e'$ are correspondingly reduced, although base circle 59 of the die remains the same, and the intersection 61' of the axes 65' and 64' of the die and the work is shifted to the left by the amount $m$ as shown in FIG. 6. This means that all points of the teeth which are radially outward of the operating pitch cone follow a prolate epicycloidal path and this will result in some interference at the areas 56 and 67 (FIG. 13). This interference may be small enough that the finish grain structure and shape of the gear teeth is acceptable but, if not, this can be overcome by providing the interdental spaces of the finished gear with a full fillet 66 (FIG. 13). In other words, the bottom of each space is an arc of a circle with the center of the arc on the operating pitch cone 60' and at the center of the interdental space (the point 67 in FIG. 13). The radius of the arc is the distance from a point on the pitch cone to the bottom of the interdental space on the gear teeth being formed and the portions of the die teeth radially outwardly of the pitch cone are given a corresponding arcuate shape.

In prior arrangements, the die teeth also have applied a sliding force to the areas 55 and 58 (FIG. 13) and, according to another aspect of the present invention this is reduced or eliminated by shaping the die teeth 46 to produce a substantially radial flow of the metal of the workpiece with the application of little or no side pressure. In addition, the reduction of side pressure on a tooth 48 of the workpiece means that the teeth on the workpiece do not deflect and permanently deform the tooth and this is achieved because the die teeth produce an essentially radial growth of the gear teeth. To this end, each tooth of each die is shaped so that successive portions of the die tooth give approximately the final form to successive portions of the gear tooth beginning at the outer end of the tooth and progressing radially inwardly. Thus, the form of the invention illustrated herein applied the general principle of my United States Reissue Patent No. 26,569 specifically to a gear rolling operation and reference may be had to that patent for a detailed description of the gear tooth growth. In order to achieve this end, each die tooth 46 is comparatively wide at the starting end of the die (see FIG. 17) and narrows progressively toward the finishing end. The wide end of the tooth is approximately equal to the width of the interdental space 47 at the outer ends of the finished gear teeth 48 and the width of the narrow end of the die tooth is approximately the same as the width of the space 47 at the root of the gear teeth.

To illustrate the foregoing generally, FIGS. 8–12 are sectional views taken at successive portions of a die 16 beginning near the starting end of the die and ending at the finishing end of the die. Thus, in FIG. 8 the portion of the die tooth 46 displaces an area 68 which forms the projection 48' and which essentially stays the same and forms the top portion of the final gear tooth 48. In FIG. 9, the die tooth displaces the area 69, moving the area 68 up so that the two areas form the projection 48''. Similarly, the next portion of the die displaces the area 70 (FIG. 10) so the three areas 68, 69 and 70 form the projection 48''' and the next die portion (FIG. 11) displaces the area 71 whereby the projection 48'''' is formed by the areas 68, 69, 70 and 71. Finally, the finishing of the die tooth (FIG. 12) displaces the area 72 and the final gear tooth 48 is formed by all the areas 68, 69, 70, 71 and 72. A composite illustration of the tooth growth is shown in FIG. 15. For purposes of explanation, the tooth growth has been shown and described in rather large steps or increments but it should be understood that the steps are considerably smaller, the size depending upon the feed rate and the rotational speed of the dies. The elimination of the application of a sliding force at the areas 55 and 58 is also applicable where the tips of the die teeth are given an arcuate shape as is the case in FIG. 13.

Figure 23:
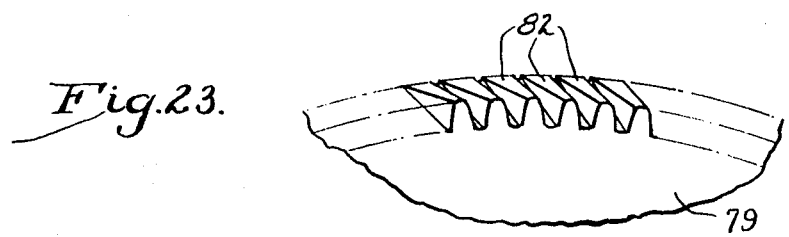
FIG. 23 is an enlarged fragmentary end view of the die shown in FIG. 22.
Figure 24:
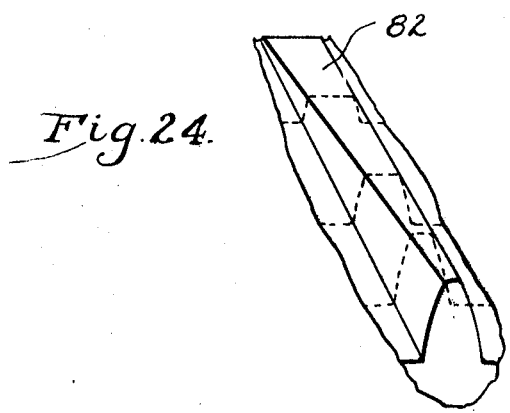
FIG. 24 is a perspective view of a tooth on the die shown in FIG. 22.

As illustrated in FIGS. 20–24, the invention also is applicable to the rolling of helical gears. In designing a die 79 for this purpose, the base circle 80, which is constant, and the operating pitch cone 81 for the die are determined in the same manner as for die to roll a spur gear, that is, in the manner described in connection with FIG. 5. Also, the teeth are tapered in the same manner as for a spur gear to produce the progressive growth of the gear teeth as illustrated in FIG. 15. The only additional determination is the lead-end hence the helix angle of the die teeth 82.

The lead and the number of teeth on the helical gear to be rolled are known. The number of the teeth 82 on the die 79 is determined by the capacity of the gear rolling machine. In other words, as was the case with the die 16, it is desirable to use the largest die possible within the capacity of the machine and the size of the die determines the number of die teeth. With these three known factors, the lead for the die can be calculated because the ratio of the lead of the die to the lead of the gear equals the ratio of the number of teeth on the die to the number of teeth on the gear.

The helix angle $h$ of the die teeth 82 varies from one end of the die 79 to the other as indicated by $h'$, $h''$ and $h'''$ in FIG. 21, although the lead is constant, and can be calculated by the following equation:

$$\text{Tan } h = \frac{D x \pi}{\text{lead}}$$

where $h$ is the helix angle and $D$ is the diameter of the operating pitch cone 81 at any point along the length of the die (see $D'$, $D''$ and $D'''$ in FIG. 21). Because the diameter of the pitch cone diameter becomes progressively smaller from the large end of the die to the small end and, accordingly, the helix angle also progressively decreases from the large end to the small end. Thus, as illustrated in FIG. 21, the helix angle at the large end is $h'$, at the small end it is $h''$, and at the middle of the die it is $h'''$.

By utilizing the present invention, gears may be rolled with teeth which have good metallurgical grain structure and which do not have tooth tip inclusions or folds. Moreover, the loads on the teeth of the dies are small enough that the dies have a commercially acceptable life.

I claim as my invention:

1. A tool for rolling a cylindrical metal workpiece to form a toothed member with the outside diameter of the member greater than the diameter of the workpiece and the root diameter of the member smaller than the diameter of the workpiece, said tool being adapted for rolling engagement with the workpiece with its axis at an angle to the axis of said workpiece, said tool comprising an elongated body having a circular cross section throughout its length, and a plurality of identical teeth extending generally longitudinally of said body and equally spaced around the periphery of the body, the outer surfaces of said teeth lying on the surface of a first cone whereby the tool has a frusto-conical shape, said teeth having an involute shape with the base circle of the involute being the same from one end of the tool to the other, the pitch circles of said teeth relative to the partially formed teeth of said member defining an imaginary cone which has its apex coincident with the intersection of the axes of the tool and the workpiece.

2. A tool as defined in claim 1 in which the teeth of said tool are straight from one end of the tool to the other.

3. A tool as defined in claim 1 in which the teeth of said tool extend helically from one end of the tool to the other whereby the tool forms a helical gear.

4. A tool as defined in claim 3 in which ratio of the lead of the teeth of the tool to the lead of the teeth of the finished workpiece equals the ratio of the number of teeth on said tool to the number of teeth on said workpiece.

5. A tool as defined in claim 1 in which said imaginary cone is coincident with the outer surfaces of the teeth of said tool.

6. A tool as defined in claim 1 in which said imaginary cone is spaced radially inwardly of the outer surfaces of said tool teeth.

7. A tool as defined in claim 6 in which those portions of said tool teeth which are radially outward of said imaginary cone have an arcuate shape with the centers of the arcs lying on said imaginary cone at the centers of the tool teeth.

8. A tool as defined in claim 1 in which said teeth of said tool are wider at the large end of the tool than at the small end and taper gradually from said large end to said small end whereby each tooth on said tool gives generally the final shape to the corresponding portions of the teeth of said workpiece.

9. A tool for rolling a cylindrical metal workpiece to form a toothed member with the outside diameter of the member greater than the diameter of the workpiece and the root diameter of the member smaller than the diameter of the workpiece, said tool being adapted for rolling engagement with the workpiece with its axis at an angle to the axis of said workpiece, said tool comprising an elongated body having a circular cross section throughout its length, and a plurality of identical teeth extending generally longitudinally of said body and equally spaced around the periphery of the body, the outer surfaces of said teeth lying on the surface of a first cone whereby the tool has a frusto-conical shape and producing a conjugate tooth action between the teeth of said tool and the teeth of said workpiece, said teeth of said tool having an involute shape with the base circle of the involute being the same from one end of the tool to the other, the pitch circles of said teeth of said tool relative to the partially formed teeth of said member defining an imaginary cone which has its apex coincident with the intersection of the axes of the tool and the workpiece.

10. A tool as defined in claim 9 in which the teeth of said tool are straight from one end of the tool to the other.

11. A tool as defined in claim 9 in which the teeth of said tool extend helically from one end of the tool to the other whereby the tool forms a helical gear.

12. A tool as defined in claim 11 in which ratio of the lead of the teeth of the tool to the lead of the teeth of the finished workpiece equals the ratio of the number of teeth on said tool to the number of teeth on said workpiece.

13. A tool as defined in claim 9 in which said imaginary cone is coincident with the outer surfaces of the teeth of said tool.

14. A tool as defined in claim 9 in which said imaginary cone is spaced radially inwardly of the outer surfaces of said tool teeth.

15. A tool as defined in claim 14 in which those portions of said tool teeth which are radially outward of said imaginary cone have an arcuate shape with the centers of the arcs lying on said imaginary cone at the centers of the tool teeth.

16. A tool as defined in claim 9 in which said teeth of said tool are wider at the large end of the tool than at the small end and taper gradually from said large end to said small end whereby each tooth on said tool gives generally the final shape to the corresponding portions of the teeth of said workpiece.

17. A tool for rolling a cylindrical metal workpiece to form a toothed member with the outside diameter of the member greater than the diameter of the workpiece and the root diameter of the member smaller than the diameter of the workpiece, the teeth of said workpiece being formed gradually over a predetermined length of the workpiece whereby the root of the partially formed teeth forming a first angle with the axis of the workpiece, said tool being adapted for rolling engagement with the workpiece with its axis at a second angle to the axis of said workpiece, said tool comprising an elongate body having a circular cross section throughout its length, and a plurality of identical teeth extending generally longitudinally of said body and equally spaced around the periphery of the body, the outer surfaces of said teeth of said tool lying on the surface of a first cone whereby the tool has a frusto-conical shape, said teeth of said tool having an involute shape with the base circle of the involute being the same from one end of the tool to the other, the pitch circles of said teeth of said tool relative to the partially formed teeth of said member defining an imaginary cone which has its apex coincident with the intersection of the axes of the tool and the workpiece, the sine of one-half of the cone angle of said imaginary cone being equal to the sine of said first angle times the number of teeth on said tool divided by the number of teeth on said workpiece and said second angle being equal to said first angle plus one-half of said cone angle.

18. A tool as defined in claim 17 in which the teeth of said tool are straight from one end of the tool to the other.

19. A tool as defined in claim 17 in which the teeth of said tool extend helically from one end of the tool to the other whereby the tool forms a helical gear.

20. A tool as defined in claim 19 in which ratio of the lead of the teeth of the tool to the lead of the teeth of the finished workpiece equals the ratio of the number of teeth on said tool to the number of teeth on said workpiece.

21. A tool as defined in claim 17 in which said imaginary cone is coincident with the outer surfaces of the teeth of said tool.

22. A tool as defined in claim 17 in which said imaginary cone is spaced radially inwardly of the outer surfaces of said tool teeth.

23. A tool as defined in claim 22 in which those portions of said tool teeth which are radially outward of said imaginary cone have an arcuate shape with the centers of the arcs lying on said imaginary cone at the centers of the tool teeth.

24. A tool as defined in claim 17 in which said teeth of said tool are wider at the large end of the tool than at the small end and taper gradually from said large end to said small end whereby each tooth on said tool gives generally the final shape to the corresponding portions of the teeth of said workpiece.

25. A tool for rolling a cylindrical metal workpiece to form a toothed member with the outside diameter of the member greater than the diameter of the workpiece and the root diameter of the member smaller than the diameter of the workpiece, the teeth of said workpiece being formed gradually over a predetermined length of the workpiece whereby the root of the partially formed teeth forming a first angle with the axis of the workpiece, said tool being adapted for rolling engagement with the workpiece with its axis at a second angle to the axis of said workpiece, said tool comprising an elongated body having a circular cross section throughout its length, and a plurality of identical teeth extending generally longitudinally of said body and equally spaced around the periphery of the body, the outer surfaces of said teeth of said tool lying on the surface of a first cone whereby the tool has a frusto-conical shape and producing a conjugate tooth action between the teeth of said tool and the teeth of said workpiece, said teeth of said tool having an involute shape with the base circle of the involute being the same from one end of the tool to the other, the pitch circles of said teeth of said tool relative to the partially formed teeth of said member defining an imaginary cone which has its apex coincident with the intersection of the axes of the tool and the workpiece, the sine of one-half of the cone angle of said imaginary cone being equal to the sine of said first angle times the number of teeth on said tool divided by the number of teeth on said workpiece and said second angle being equal to said first angle plus one-half of said cone angle.

26. A tool as defined in claim 25 in which the teeth of said tool are straight from one end of the tool to the other.

27. A tool as defined in claim 25 in which the teeth of said tool extend helically from one end of the tool to the other whereby the tool forms a helical gear.

28. A tool as defined in claim 27 in which ratio of the lead of the teeth of the tool to the lead of the teeth of the finished workpiece equals the ratio of the number of teeth on said tool to the number of teeth on said workpiece.

29. A tool as defined in claim 25 in which said imaginary cone is coincident with the outer surfaces of the teeth of said tool.

30. A tool as defined in claim 25 in which said imaginary cone is spaced radially inwardly of the outer surfaces of said tool teeth.

31. A tool as defined in claim 30 in which those portions of said tool teeth which are radially outward of said imaginary cone have an arcuate shape with the centers of the arcs lying on said imaginary cone at the centers of the tool teeth.

32. A tool as defined in claim 25 in which said teeth of said tool are wider at the large end of the tool than at the small end and taper gradually from said large end to said small end whereby each tooth on said tool gives generally the final shape to the corresponding portions of the teeth of said workpiece.

References Cited

UNITED STATES PATENTS

| | | | |
|---|---|---|---|
| 935,636 | 10/1909 | Brun | 29—159.2 |
| 1,510,889 | 10/1924 | Hooker | 29—159.2 |
| 1,617,445 | 2/1927 | Gleason et al. | 29—159.2 |
| 3,137,185 | 6/1964 | Glicken | 72—110 |
| 1,558,086 | 10/1925 | Gustavsen | 72—110 |
| 744,231 | 11/1903 | Puddefoot | 72—105 |
| 3,174,319 | 3/1965 | Koyama et al. | 72—102 |
| 2,934,980 | 5/1960 | Grob et al. | 72—95 |
| 1,500,567 | 7/1924 | Anderson | 29—110 |

CHARLES W. LANHAM, Primary Examiner

M. J. KEENAN, Assistant Examiner

U.S. Cl. X.R.

29—159.1; 72—110